United States Patent
Gaitonde et al.

(10) Patent No.: US 12,145,725 B2
(45) Date of Patent: Nov. 19, 2024

(54) FUEL TANK STRINGER WITH FLOW PASSAGE

(71) Applicant: AIRBUS OPERATIONS LIMITED, Bristol (GB)

(72) Inventors: John Martin Gaitonde, Bristol (GB); Chris Heaysman, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days.

(21) Appl. No.: 18/109,672

(22) Filed: Feb. 14, 2023

(65) Prior Publication Data
US 2023/0257101 A1    Aug. 17, 2023

(30) Foreign Application Priority Data
Feb. 15, 2022 (GB) ..................................... 2202010

(51) Int. Cl.
*B64C 3/34* (2006.01)
(52) U.S. Cl.
CPC ...................................... *B64C 3/34* (2013.01)
(58) Field of Classification Search
CPC .. B64C 3/34; B64C 3/18; B64C 3/182; Y02T 50/40; B64D 37/06; B64D 37/04
See application file for complete search history.

(56) References Cited

U.S. PATENT DOCUMENTS

| | | | | |
|---|---|---|---|---|
| 3,587,914 A | * | 6/1971 | Jennings | B64D 37/06 220/900 |
| 5,242,523 A | * | 9/1993 | Willden | B29C 70/44 244/119 |
| 7,871,040 B2 | * | 1/2011 | Lee | B64C 1/12 244/119 |
| 8,580,170 B2 | * | 11/2013 | Law | B29C 70/84 156/82 |

(Continued)

FOREIGN PATENT DOCUMENTS

| | | | | |
|---|---|---|---|---|
| CA | 2715277 A1 | * | 9/2009 | ............. B64C 1/064 |
| CA | 2828723 A1 | * | 4/2014 | ............... B64C 1/06 |

(Continued)

OTHER PUBLICATIONS

Extended European Search Report for Application No. EP 23155092. 2, 15 pages, dated Jun. 27, 2023.

(Continued)

*Primary Examiner* — Assres H Woldemaryam
(74) *Attorney, Agent, or Firm* — Nixon & Vanderhye P.C.

(57) ABSTRACT

A fuel tank is disclosed including a lower cover and an upper cover. The lower cover or the upper cover includes a panel assembly. The panel assembly includes a panel and a stringer attached to the panel. The stringer includes a pair of portions which are spaced apart in a lengthwise direction of the stringer and connected to each other by a bridge. Each portion is connected to a respective end of the bridge, and each end of the bridge deviates away from the panel. The stringer includes reinforcement fibres which extend between (Continued)

the portions via the bridge. Each reinforcement fibre deviates away from the panel at each end of the bridge. The stringer includes a stringer recess between the bridge and the panel, and a flow passage in the stringer recess through which fluid can flow across the stringer.

18 Claims, 13 Drawing Sheets

(56) References Cited

U.S. PATENT DOCUMENTS

| | | | |
|---|---|---|---|
| 8,636,252 B2* | 1/2014 | Pook | B29C 65/5057 |
| | | | 244/119 |
| 9,771,140 B2* | 9/2017 | Arevalo Rodriguez | |
| | | | B64C 1/061 |
| 9,809,297 B2* | 11/2017 | Charles | B32B 3/18 |
| 10,035,588 B2* | 7/2018 | Campbell, Jr. | B29C 70/00 |
| 10,272,619 B2* | 4/2019 | Lockett | B29C 70/446 |
| 11,014,644 B2* | 5/2021 | Webb | B64C 1/064 |
| 11,097,522 B2* | 8/2021 | Iagulli | B32B 7/12 |
| 11,643,184 B2* | 5/2023 | Behzadpour | B29C 70/30 |
| | | | 244/123.8 |
| 2001/0035251 A1* | 11/2001 | Matsui | B29C 70/345 |
| | | | 156/82 |
| 2002/0144401 A1 | 10/2002 | Nogueroles Vines et al. | |
| 2005/0112394 A1* | 5/2005 | Pham | B64C 3/26 |
| | | | 244/123.1 |
| 2009/0261199 A1 | 10/2009 | McCarville et al. | |
| 2009/0320398 A1* | 12/2009 | Gouvea | B29C 66/474 |
| | | | 52/309.1 |
| 2010/0178453 A1 | 7/2010 | Wood | |
| 2011/0073708 A1 | 3/2011 | Biornstad et al. | |
| 2011/0315824 A1* | 12/2011 | Pook | B29D 99/0017 |
| | | | 264/102 |
| 2012/0052247 A1* | 3/2012 | Pook | B29C 66/4722 |
| | | | 156/60 |
| 2012/0153082 A1* | 6/2012 | Rosman | B64C 1/12 |
| | | | 403/179 |
| 2012/0312922 A1* | 12/2012 | Rosman | B64C 1/065 |
| | | | 244/119 |
| 2013/0099058 A1* | 4/2013 | Payne | B29C 70/887 |
| | | | 156/263 |
| 2013/0209746 A1* | 8/2013 | Reighley | B64C 1/12 |
| | | | 428/172 |
| 2013/0316147 A1* | 11/2013 | Douglas | B64C 3/182 |
| | | | 156/60 |
| 2014/0216638 A1* | 8/2014 | Vetter | B64F 5/10 |
| | | | 156/227 |
| 2015/0183504 A1 | 7/2015 | Arevalo Rodriguez | |
| 2015/0321743 A1* | 11/2015 | Raeckers | B64F 5/00 |
| | | | 244/119 |
| 2016/0009366 A1* | 1/2016 | Marks | B64C 3/187 |
| | | | 156/217 |
| 2016/0089856 A1* | 3/2016 | Deobald | B32B 7/12 |
| 2016/0176500 A1* | 6/2016 | Ross | B29D 99/0014 |
| | | | 428/157 |
| 2016/0368583 A1* | 12/2016 | Yamamori | B29C 70/06 |
| 2017/0335079 A1* | 11/2017 | Polus | B05D 1/02 |
| 2019/0047676 A1* | 2/2019 | Behzadpour | B64C 1/064 |
| 2020/0010176 A1* | 1/2020 | Douglas | B64C 3/38 |
| 2020/0086969 A1* | 3/2020 | Abadi | B64C 3/187 |
| 2020/0140054 A1* | 5/2020 | Osborne | B29C 66/112 |
| 2020/0147947 A1* | 5/2020 | Iagulli | B29D 99/0014 |
| 2022/0024556 A1* | 1/2022 | Heaysman | B64C 1/061 |
| 2022/0033049 A1* | 2/2022 | Behzadpour | B29C 70/202 |
| 2022/0033058 A1* | 2/2022 | Behzadpour | B64D 37/04 |
| 2022/0033060 A1* | 2/2022 | Behzadpour | B64C 3/32 |
| 2022/0080683 A1* | 3/2022 | Plummer | B29C 33/308 |

FOREIGN PATENT DOCUMENTS

| | | | | |
|---|---|---|---|---|
| CA | 3101081 A1 * | 8/2021 | | B29C 70/302 |
| CN | 211519868 | 9/2020 | | |
| CN | 211519868 U * | 9/2020 | | |
| GB | 2527185 A * | 12/2015 | | B64C 3/182 |
| GB | 2544080 | 5/2017 | | |
| GB | 2583940 A * | 11/2020 | | B29B 11/16 |
| GB | 2583941 A * | 11/2020 | | B29B 11/16 |
| JP | H03-123798 | 12/1991 | | |
| JP | H07-172395 | 7/1995 | | |
| WO | WO-0216784 A2 * | 2/2002 | | B29C 65/56 |

OTHER PUBLICATIONS

Combined Search and Examination Report for Application No. GB2202010.1, nine pages, dated Aug. 12, 2022.

* cited by examiner

FUEL TANK STRINGER WITH FLOW PASSAGE

CROSS RELATED APPLICATION

This application claims priority to United Kingdom Patent Application GB 2202010.1, filed Feb. 15, 2022, the entire contents of which is hereby incorporated by reference.

FIELD OF THE INVENTION

The present invention relates to a fuel tank, such as an aircraft fuel tank, comprising a panel assembly. The panel assembly comprises a panel and a stringer attached to the panel.

BACKGROUND OF THE INVENTION

In an aircraft fuel tank lower cover, fuel can be trapped in stringer bays and prevented from flowing to a low point of the fuel tank where a fuel pump will be located.

In an aircraft fuel tank upper cover, air can become trapped in a similar way in stringer bays and thus prevented from flowing to a high point of the fuel tank where it can be released by a venting system.

SUMMARY OF THE INVENTION

A first aspect of the invention provides a fuel tank comprising a lower cover and an upper cover; wherein the lower cover or the upper cover comprises a panel assembly; the panel assembly comprises a panel and a stringer attached to the panel; the stringer comprises a pair of portions which are spaced apart in a lengthwise direction of the stringer and connected to each other by a bridge; each portion is connected to a respective end of the bridge; each end of the bridge deviates away from the panel; the stringer comprises reinforcement fibres which extend between the portions via the bridge; each reinforcement fibre deviates away from the panel at each end of the bridge; and the stringer comprises a stringer recess between the bridge and the panel, and a flow passage in the stringer recess through which fluid can flow across the stringer.

Optionally the stringer comprises a foot and a stiffening part; and the foot is attached to the panel.

Optionally the portions comprise attachment portions of the foot; and the attachment portions of the foot are attached to the panel.

Optionally the portions comprise stiffening portions of the stiffening part.

Optionally the bridge comprises a core, and a shell surrounding the core.

Optionally the bridge comprises a core and a shell surrounding the core; the shell comprises a shell foot which is attached to the panel; the portions comprise portions of the core; and the shell foot is between the bridge and the panel.

Optionally the stringer comprises a core and a shell surrounding the core; the shell comprises a shell foot; and the portions comprise attachment portions of the shell foot which are attached to the panel.

Optionally the bridge comprises a fibre-reinforced composite material, and the reinforcement fibres are fibres of the fibre-reinforced composite material.

Optionally the reinforcement fibres follow curved paths as they deviate away from the panel at each end of the bridge.

Optionally the stringer is adhered to the panel.

The stringer is attached to one cover but not the other. That is, the stringer may be attached to the upper cover and not attached to the lower cover; or the stringer may be attached to the lower cover and not attached to the upper cover.

Optionally the fuel tank further comprises a pair of further stringers attached to the panel on opposites sides of the stringer; a first stringer bay; and a second stringer bay, wherein each stringer bay is between the stringer and a respective one of the further stringers, and the flow passage enables fluid to flow from the first stringer bay to the second stringer bay.

Each further stringer is attached to one cover but not the other. That is, each further stringer may be attached to the upper cover and not attached to the lower cover; or each further stringer may be attached to the lower cover and not attached to the upper cover.

Optionally the lower cover comprises the panel assembly; and the flow passage enables liquid fuel to flow across the stringer.

Optionally the fuel tank further comprises a rib attached to the panel; wherein the rib comprising a rib recess, the stringer passes through the rib recess between the rib and the panel, and the rib recess is configured to provide a flow passage through which fluid can flow across the rib.

Optionally the fuel tank further comprises a fitting in the stringer recess, wherein the flow passage is in the fitting.

Optionally the bridge comprises an outer surface which deviates away from the panel at each end of the bridge to form a protrusion.

Optionally the bridge has a depth at an apex of the protrusion; and each portion has a depth which is substantially the same as the depth of the bridge at the apex of the protrusion.

Optionally the protrusion comprises a pair of ramps, and an apex between the ramps.

Optionally the bridge and/or each reinforcement fibre deviates away from the panel to form a hump.

Optionally the fuel tank is an aircraft fuel tank.

Optionally the reinforcement fibres are 0 degree fibres which extend parallel with the lengthwise direction of the stringer. Alternatively the reinforcement fibres may follow spiral paths along the length of the stringer, wherein a central axis of each spiral path deviates away from the panel at each end of the bridge.

A further aspect of the invention provides an aircraft wing comprising an aircraft fuel tank according to the first aspect of the invention, wherein the aircraft wing extends in a spanwise direction from a wing root to a wing tip; and the lengthwise direction of the stringer extends in the spanwise direction.

A further aspect of the invention provides a fuel tank comprising a lower cover and an upper cover; wherein the lower cover or the upper cover comprises a panel assembly; the panel assembly comprises a panel and a stringer attached to the panel; the stringer comprises a pair of portions which are spaced apart in a lengthwise direction of the stringer and connected to each other by a bridge; each portion is connected to a respective end of the bridge; each end of the bridge deviates away from the panel; the bridge comprises an outer surface which deviates away from the panel at each end of the bridge to form a protrusion; the stringer comprises reinforcement fibres which extend between the portions via the bridge; and the stringer comprises a stringer recess between the bridge and the panel, and a flow passage in the stringer recess through which fluid can flow across the stringer.

The stringer is attached to one cover but not the other. That is, the stringer may be attached to the upper cover and not attached to the lower cover; or the stringer may be attached to the lower cover and not attached to the upper cover.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
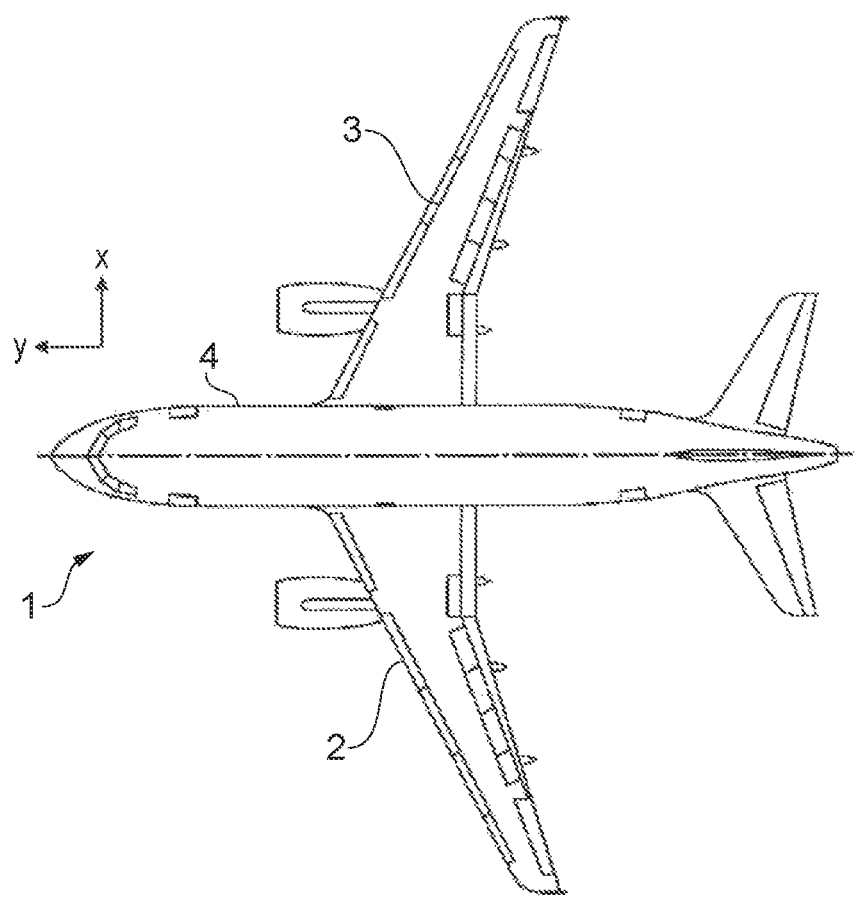
FIG. 1 shows an aircraft.

FIG. 1 shows an aircraft 1 with port and starboard wings 2, 3. Each wing has a cantilevered structure with a length extending in a spanwise direction 42 from a root to a tip, the root being joined to an aircraft fuselage 4. The wings 2, 3 are similar in construction so only the starboard wing 3 will be described in detail with reference to FIGS. 2 and 3.

Figure 2:
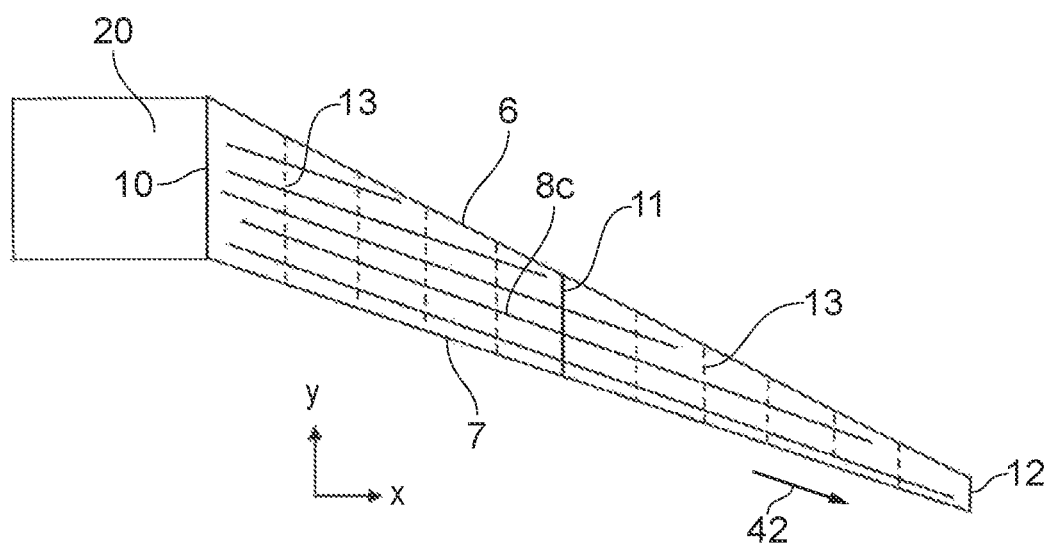
FIG. 2 shows a starboard wing of the aircraft.
Figure 3:
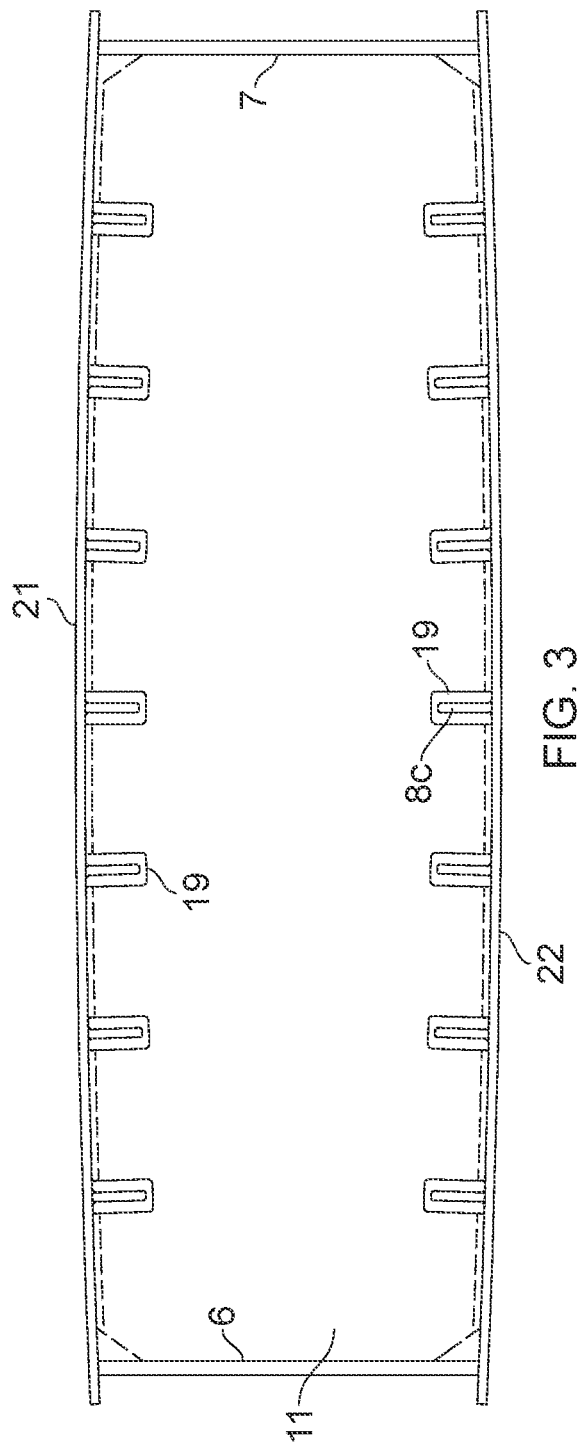
FIG. 3 is a sectional view of a wingbox of the starboard wing.

The main structural element of the wing 3 is a wing box formed by upper and lower covers 21, 22 and front and rear spars 6, 7 shown in cross-section in FIG. 3. The covers 21, 22 and spars 6, 7 are each Carbon Fibre Reinforced Polymer (CFRP) laminate components. Each cover comprises a panel assembly with a curved aerodynamic outer surface (the upper surface of the upper cover 21 and the lower surface of the lower cover 22) over which air flows during flight of the aircraft. The panel of each panel assembly also has an inner surface carrying a series of stringers extending in the spanwise direction 42. Each cover carries a large number of stringers, only five of which are shown in FIG. 2 (labelled 8a-e) and only seven of which are shown in FIG. 3 for purposes of clarity. One of the stringers 8c is labelled in FIGS. 2 and 3. A much larger number of stringers may be applied across the chord of the wing. Each stringer is joined to one cover but not the other.

The wing box also has a plurality of transverse ribs, each rib being joined to the covers 21, 22 and the spars 6, 7. The ribs include an inner-most inboard rib 10 located at the root of the wing box, and a number of further ribs spaced apart from the inner-most rib along the length of the wing box. The wing box is divided into two fuel tanks: an inboard wing fuel tank bounded by the inboard rib 10, a mid-span rib 11, the covers 21, 22 and the spars 6, 7; and an outboard wing fuel tank bounded by the mid-span rib 11, an outboard rib 12 at the tip of the wing box, the covers 21, 22 and the spars 6, 7.

The inboard rib 10 is an attachment rib which forms the root of the wing box and is joined to a centre wing box 20 within the body of the fuselage 4. Baffle ribs 13 (shown in dashed lines in FIG. 2) form internal baffles within the fuel tanks which divide the fuel tanks into rib bays. The ribs 10, 11, 12 are sealed to prevent the flow of fuel out of the two fuel tanks, but the baffle ribs 13 are not sealed so that fuel can flow across them between the rib bays. As can be seen in FIG. 2, the stringers stop short of the inboard rib 10 and the outboard rib 12, but pass through the baffle ribs 13 and the mid-span rib 11.

Each rib 10, 11, 12, 13 connects the upper cover 21 to the lower cover 22, and FIG. 3 shows the upper and lower rib/cover connection arrangements for the rib 11 by way of example. The stringers 8c etc. pass through rib recesses 19 in the rib 11.

As noted above, the upper and lower covers 21, 22 provide the upper and lower walls respectively of the fuel tanks of the wing.

Figure 4:
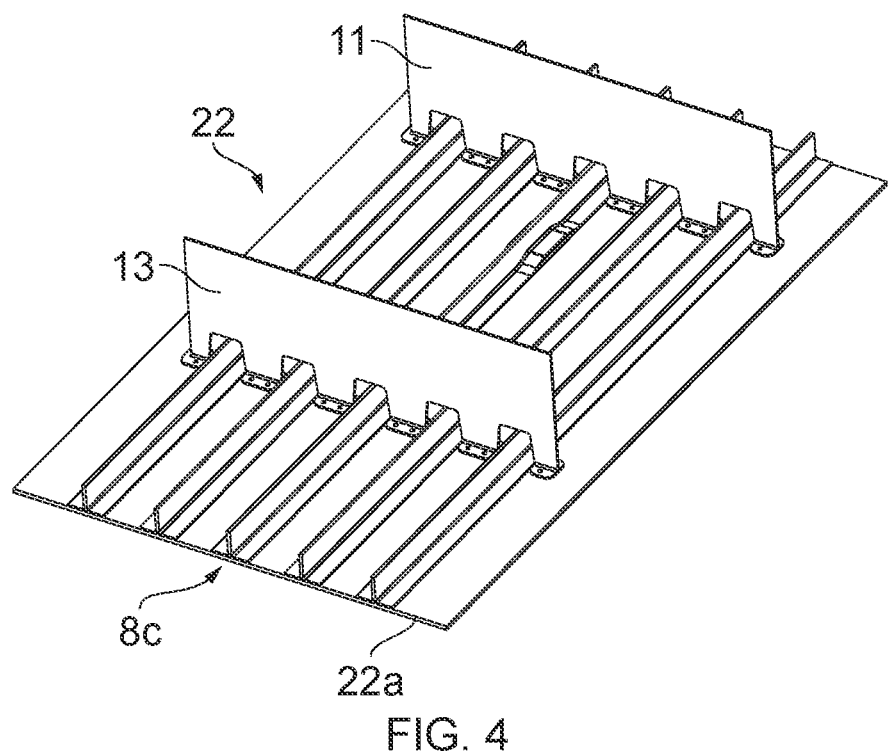
FIG. 4 is an isometric view of part of the lower cover and a pair of ribs, according to a first embodiment of the invention.
Figure 5:
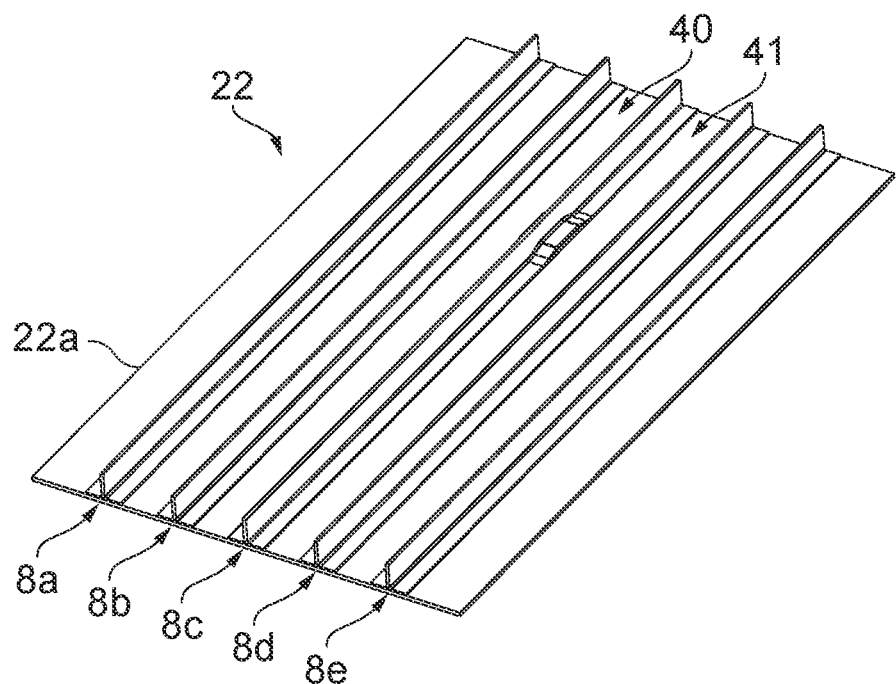
FIG. 5 shows the lower cover of FIG. 4 without the ribs.

FIG. 4 shows part of the lower cover 22, an adjacent pair of ribs 11, 13, and five of the stringers-. The lower cover 22 comprises a panel assembly 22a which is shown in FIG. 5 without the ribs 11, 13. The panel assembly of FIG. 5 comprises a panel 22a and the stringers, which are numbered individually as 8a-8e.

As shown in FIG. 4, the ribs 11, 13 are attached to the panel 22a by fasteners which pass through rib feet. The rib recesses 19 (or "mouseholes") are between the rib feet, and the stringers passes through the rib recesses 19 between the rib and the panel 22a. The ribs 11, 13 are attached to the upper cover 21 in a similar way.

The rib recesses in the baffle rib 13 are not sealed, so they provide flow passages through which liquid can flow across the baffle rib 13. The rib recesses in the mid-span rib 11 may be sealed to prevent such flow across the rib 11.

One of the stringers 8c is formed with a stringer recess, which will be explained further below. A pair of further stringers 8b, 8d are attached to the panel 22a on opposites of the stringer 8c. The panel assembly comprises a first stringer bay 40 and a second stringer bay 41. Each stringer bay is between the stringer 8c and a respective one of the further stringers 8b, 8d.

A flow passage is provided in the stringer recess through which liquid can flow across the stringer 8c, from the first stringer bay 40 to the second stringer bay 41. The second stringer bay 41 may be at a low point of the wing, and may contain a fuel pump or other fuel pickup (not shown).

Figure 8:
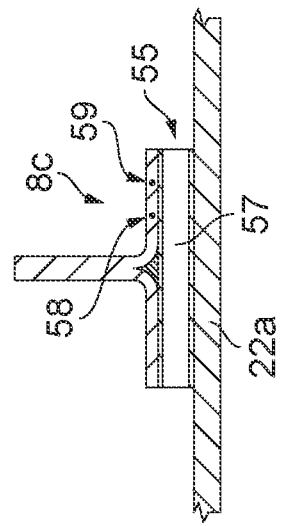
FIG. 8 is a transverse sectional view across the bridge, taken along a line B-B in FIG. 6.
Figure 9:
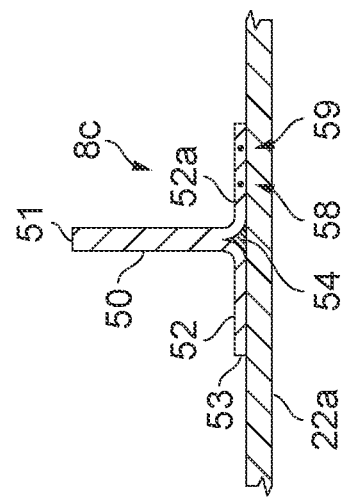
FIG. 9 is a transverse sectional view across the stringer, taken along a line C-C in FIG. 6.
Figure 7:
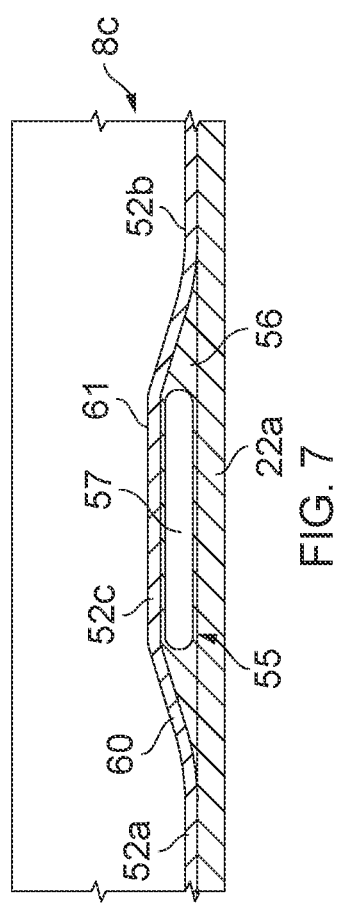
FIG. 7 is a longitudinal sectional view along the bridge, taken along a line A-A in FIG. 6.
Figure 6:
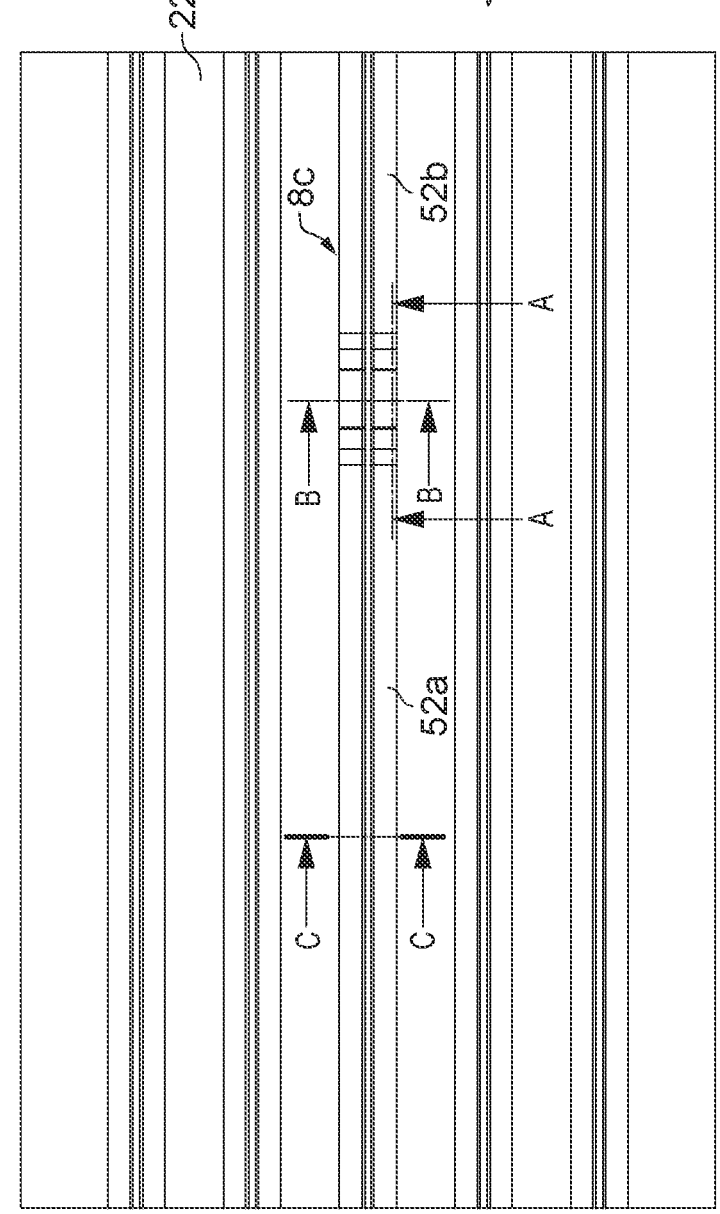
FIG. 6 is a plan view of the panel assembly of FIG. 5.
Figure 10:
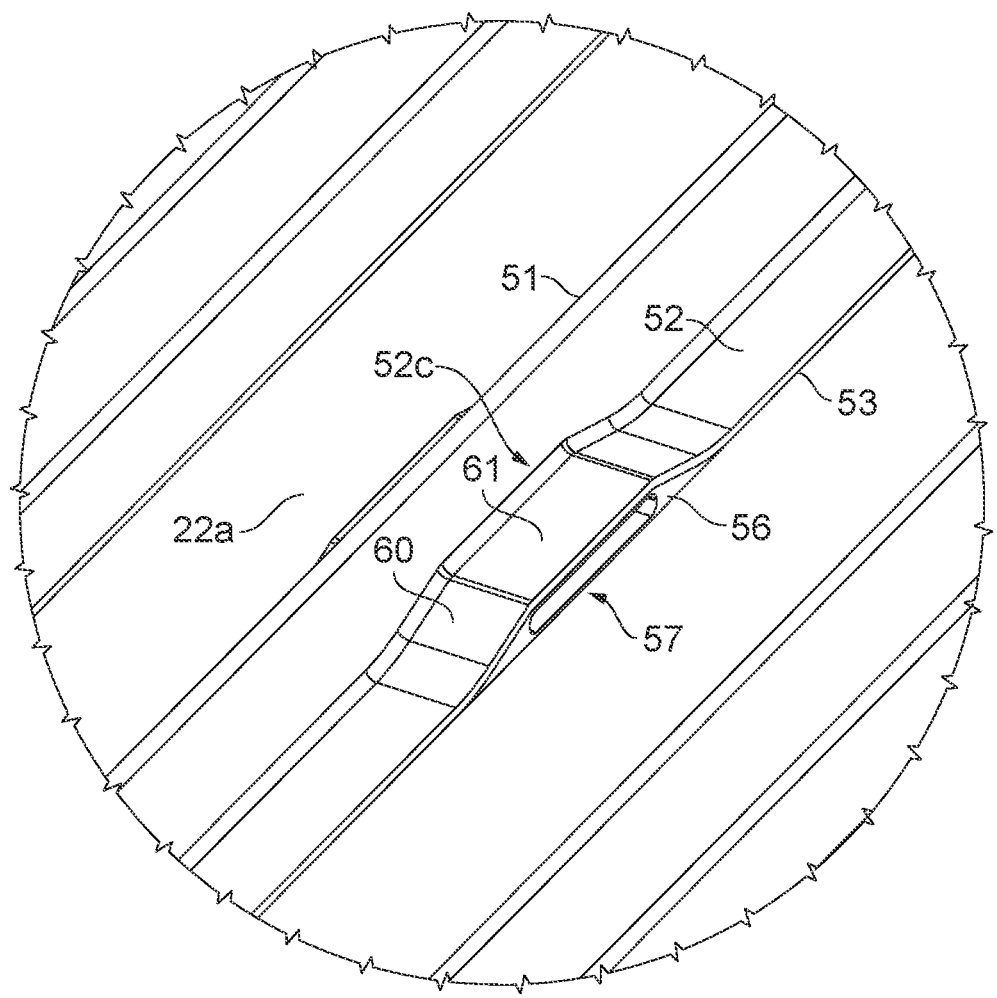
FIG. 10 is an isometric view showing the bridge and flow passage.
Figure 11:
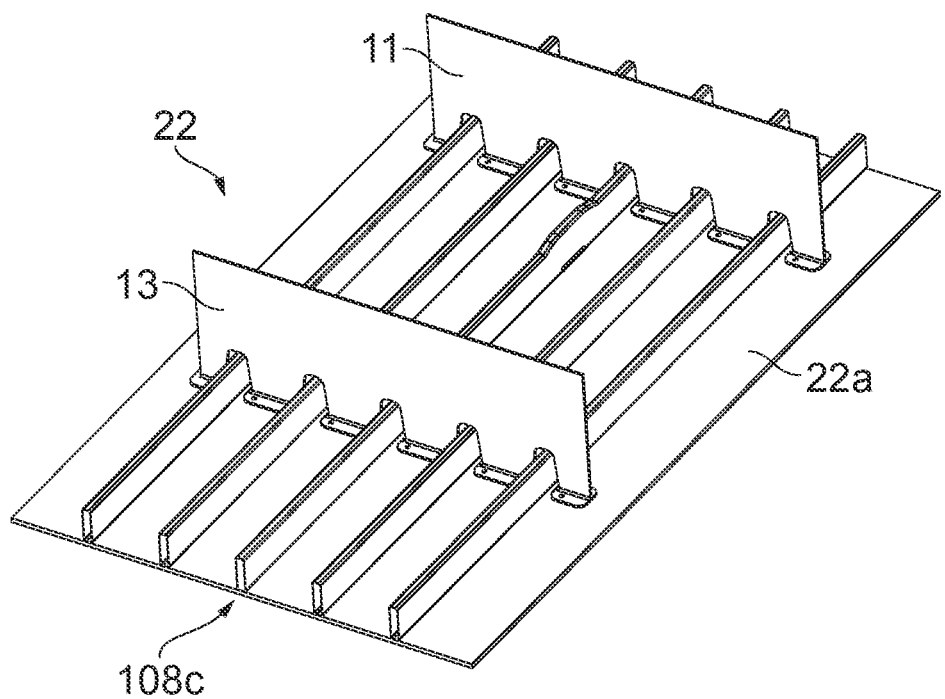
FIG. 11 is an isometric view of part of the lower cover and a pair of ribs, according to a second embodiment of the invention.
Figure 12:
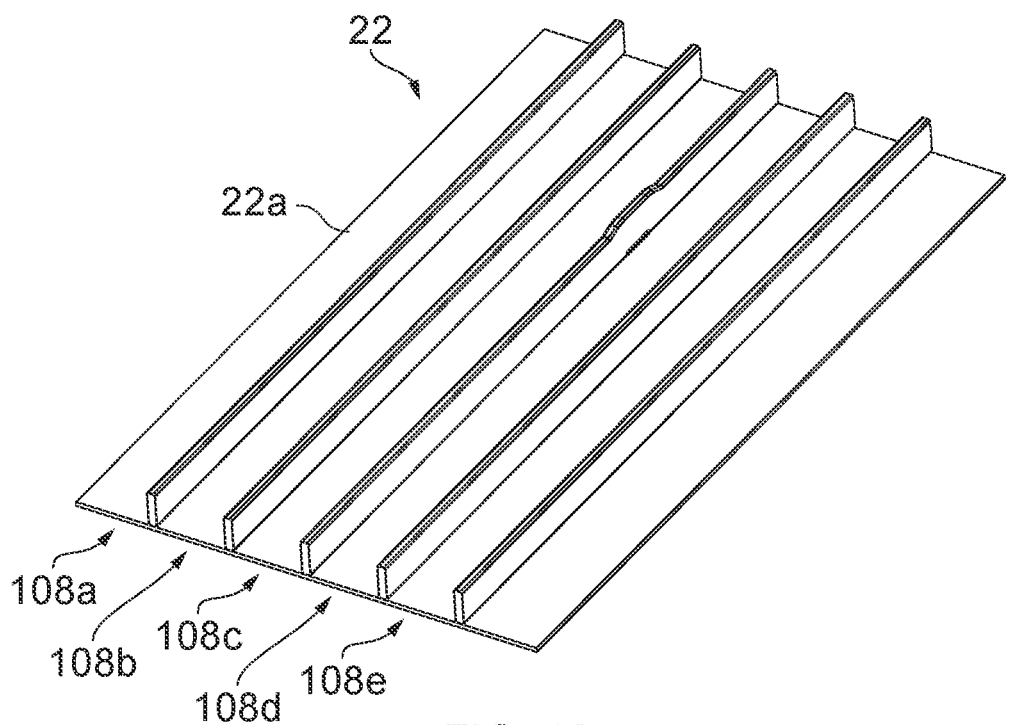
FIG. 12 shows the lower cover of FIG. 11 without the ribs.

The stringer 8c is shown in cross-section in FIGS. 7-9. The stringer 8c comprises a pair of feet and a stiffening part. In this case the stiffening part is a blade 50 which extends away from the panel 22a to a free crown 51, and each foot comprises a flange 52 which extends away from the blade 50 to a flange edge 53. The stringer 8c in this case has a conventional "T-section" cross-section. The stringer 8c may be manufactured by forming a pair of L-section parts and joining them back-to-back. A noodle 54 fills the gap where the corners of the L-section parts meet.

Each L-section part may comprise a carbon-fibre reinforced epoxy resin composite material, or any other suitable fibre-reinforced composite material. The L-section parts may be formed by tape laying, or any other suitable manufacturing technique.

The stringer 8c is symmetrical, so only one of the feet will be described. As shown in FIG. 7, the foot comprises a pair of attachment portions 52a, 52b and a bridge 52c. The pair of attachment portions 52a, 52b are spaced apart in a lengthwise direction of the stringer 8c, which extends in the spanwise direction 42 of the wing.

The pair of attachment portions 52a, 52b are connected to each other by the bridge 52c. Each attachment portion 52a, 52b of the foot comprises an inner (lower) surface adhered to the panel 22a, and an outer (upper) surface facing away from the panel 22a.

Each attachment portion 52a, 52b is connected to a respective end of the bridge 52c. Each end of the bridge deviates away from the panel to form a hump which makes space for a concave stringer recess 55 in the underside of the stringer 8c. The stringer recess 55 is positioned between the bridge 52c and the panel 22a.

The bridge 52c follows a curved path as it deviates away from the panel 22a, then it follows a planar ramp 60 up to a flat apex 61 of the bridge 52c.

The bridge 52c has an inner (lower) surface which deviates away from the panel at each end of the bridge to form the stringer recess 55. The bridge also has an outer (upper) surface which deviates away from the panel at each end of the bridge to form a convex protrusion.

A fitting 56 in the stringer recess 55 has a through-hole 57 which provides a flow passage through which liquid fuel can flow across the stringer 8c. The fitting 56 may be formed from a foam material, a fibre-reinforced epoxy resin composite material made from recycled short carbon-fibres, or any other suitable lightweight material. The inner (lower) surface of the bridge 52c is adhered to the insert 56.

The flow passage 57 stops liquid fuel being trapped in the first or second stringer bay. For example if the second stringer bay 41 is lower than the first stringer bay 40, then the flow passage 57 enables the fuel to flow under gravity from the first stringer bay 40 to the second stringer bay 41. Such flow becomes important when the fuel level drops (through use or defuel) so that only a small slug of fuel remains. The flow passage 57 allows the fuel to flow to the next stringer bay (usually running forward to aft due to the angle of incidence of the wing) until it gets to the lowest tank point, the sump, where the fuel pump pick up is located. Thus the amount of trapped fuel is kept relatively low.

In this example, only one of the stringers 8c has a stringer recess, but optionally all or some of the stringers 8a-e may have a similar stringer recess.

As noted above, the pair of L-section parts may be formed by tape laying, or any other suitable manufacturing technique. During this process, carbon reinforcement fibres are laid up which extend parallel to the lengthwise direction of the stringer, which is aligned with the spanwise direction 42 of the wing. These reinforcement fibres are known as 0 degree fibres, and preferably they run continuously along the full length of the stringer or at least along a majority of the length of the stringer. The continuity of these 0 degree fibres in the stringer foot is maintained by the undulating shape of the bridge 52c, which ensures that such 0 degree fibres do not need to be cut or otherwise terminated at the stringer recess 55. Thus the 0 degree fibres extend continuously between the attachment portions 52a, 52b of the foot via the bridge 52c.

In order to maintain continuity of the 0 degree fibres through the full thickness of the foot, each 0 degree fibre deviates away from the panel at each end of the bridge to form a hump following the same undulating contour as the bridge. An exemplary pair of 0 degree fibres 58, 59 is indicated in FIGS. 8 and 9. The bridge 52c comprises a large number of such undulating 0 degree fibres.

The 0 degree fibres 58, 59 follow the undulating shape of the bridge 52c. Thus the 0 degree fibres follow curved paths as they deviate away from the panel at each end of the bridge 52c, then they follow ramps up to a flat apex between the ramps. Each ramp is rounded where it meets the apex.

The stringer foot may also comprise fibres running at different angles, for instance they may be 45 degree fibres running at +/−45 degrees to the length of the stringer.

In this example all of the 0 degree fibres in the bridge 52c deviate away from the panel at each end of the bridge 52c. However this is not essential, and optionally further reinforcement fibres may be provided in the bridge 52c which either do not deviate away from the panel or do not extend along the full length of the bridge 52c.

In this example, the crown of the stringer (which in this case is the crown 51 of the blade 50) has no protrusion at the recess, as can be seen most clearly in FIG. 7. Thus the 0 degree fibres in the blade 50 follow straight paths rather than following the undulating shape of the bridge 52c.

FIGS. 11-17 show an alternative embodiment. The ribs 11, 13 and cover panel 22a are given the same reference number and will not be described again. The stringers 8a-d are replaced by stringers 108a-d, one of which (stringer 108c) is formed with a stringer recess.

Figure 16:
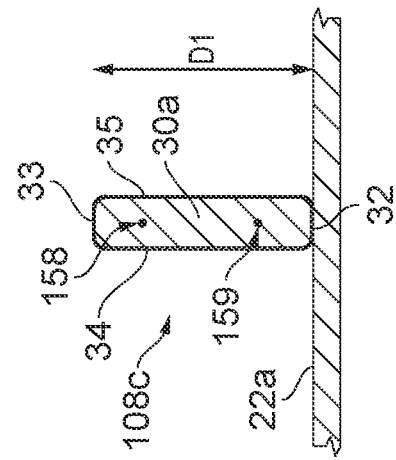
FIG. 16 is a transverse sectional view across the stringer, taken along a line F-F in FIG. 13.
Figure 15:
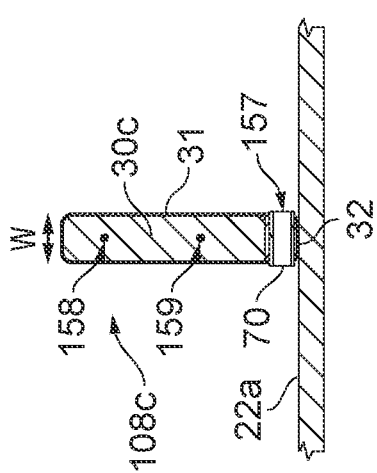
FIG. 15 is a transverse sectional view across the bridge, taken along a line E-E in FIG. 13.

FIGS. 15 and 16 show the stringer 108c in cross-section transverse to its length. The other stringers have the same construction.

The stringer 108c comprises a core 30 and a shell 31. The shell 31 has a closed cross-section and fully surrounds the core 30 on all sides. In this example the shell 31 has a substantially rectangular outer profile, with rounded corners, although other shapes are possible.

The shell 31 is formed from a fibre-reinforced composite material, such as a carbon-fibre reinforced polymer. For example the shell 31 may comprise a layer of woven fabric which is wrapped around the core 30, or it may be formed by braiding.

The shell 31 comprises a shell foot 32; a shell crown 33 opposite the shell foot 32; a first side wall 34; and a second side wall 35 opposite the first side wall 34. The shell foot 32 provides a foot of the stringer 108c and is adhered to the panel 22a. Beads of adhesive (not shown) may be applied where the rounded corners of the shell 31 meet the panel 22a, to help reinforce the skin to stringer connection. These beads of adhesive could be applied pre-infusion and pre-cure.

The core 31 and the vertical side walls 34, 35 of the shell provide a stiffening part of the stringer.

Each side wall 34, 35 is longer than the shell foot 32, viewed in section transverse to the lengthwise direction of the stringer, as in FIG. 16. Each side wall 34, 35 is also longer than the shell crown 33, viewed in section transverse to the lengthwise direction of the stringer, as in FIG. 16.

The first and second side walls 34, 35 are vertical and substantially parallel with each other. The stringer 108c can be inspected by various non-destructive testing (NDT) techniques. In one example, ultrasound is directed into the stringer through one of its side walls 34, 35, and the reflections analysed. The vertical orientation of the side walls 34, 35 makes the stringer easy to inspect in this way, because the ultrasound is directed back to the NDT probe rather than being directed up at an angle by an oblique sidewall. However, in other embodiments the shell 31 may have a trapezoidal section so that the first and second side walls 34, 35 are not parallel with each other.

The core 30 is formed from a fibre-reinforced composite material, which may be a carbon-fibre reinforced polymer like the shell 31, or another type of fibre-reinforced composite material.

Figure 14:
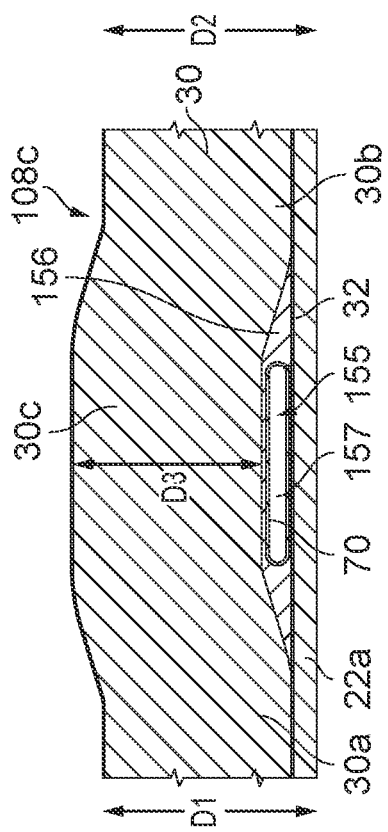
FIG. 14 is a longitudinal sectional view along the bridge, taken along a line D-D in FIG. 13.
Figure 13:
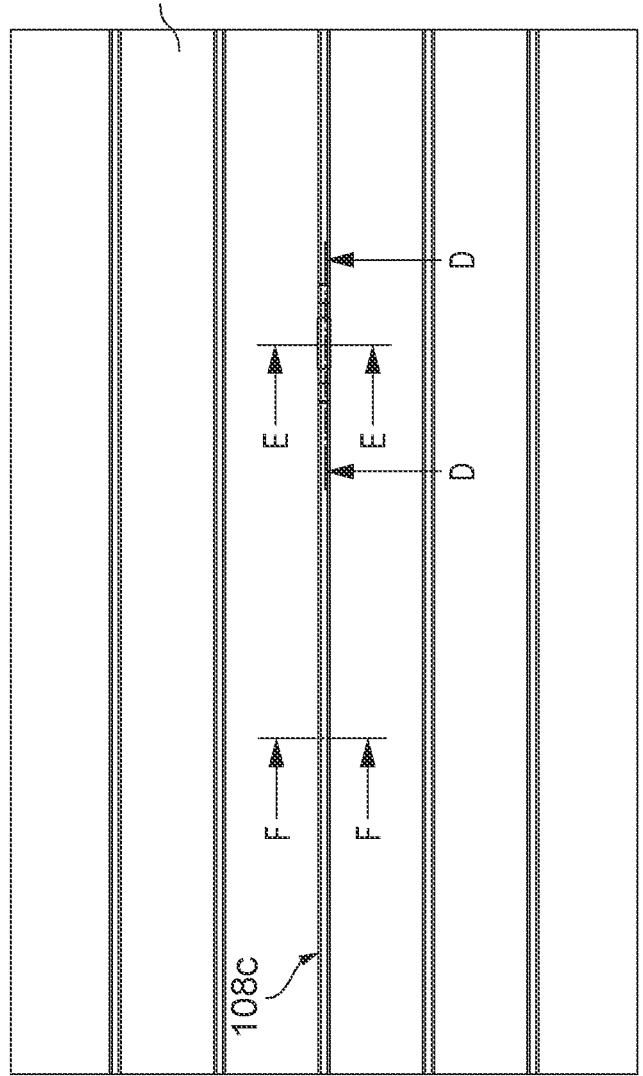
FIG. 13 is a plan view of the panel assembly of FIG. 12.
Figure 17:
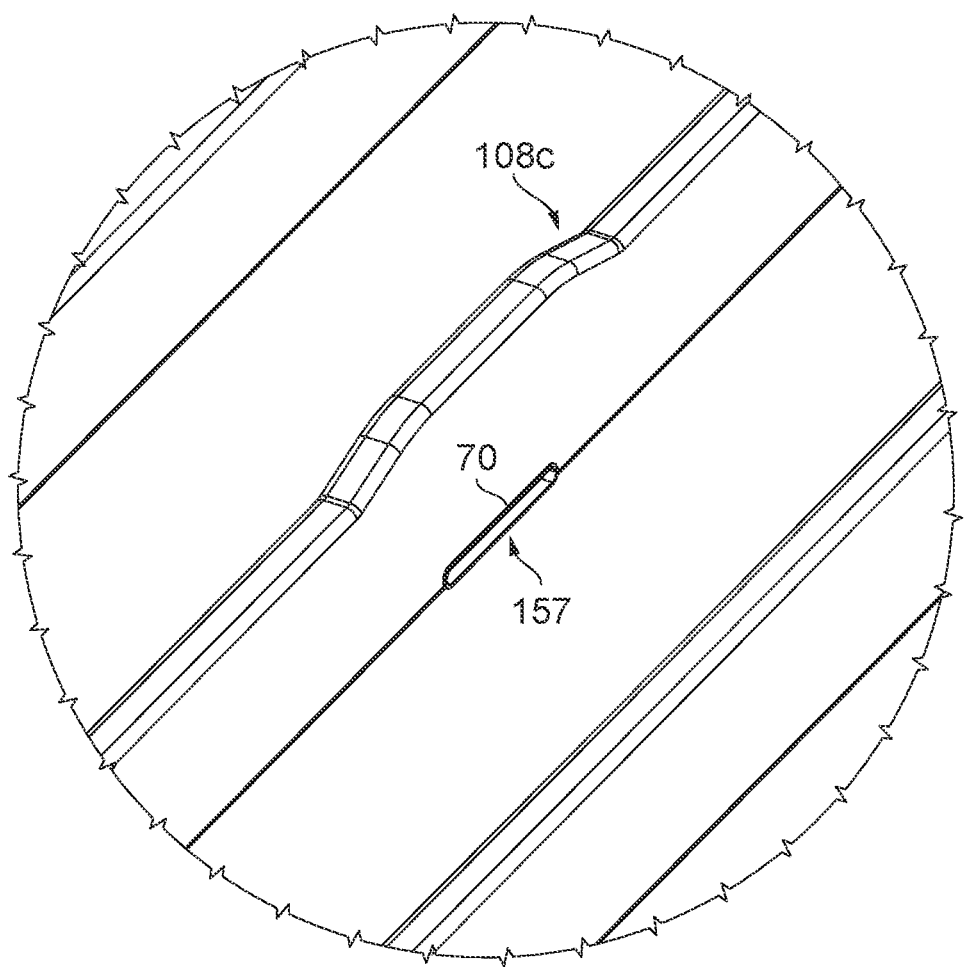
FIG. 17 is an isometric view showing the bridge and flow passage.
Figure 18:
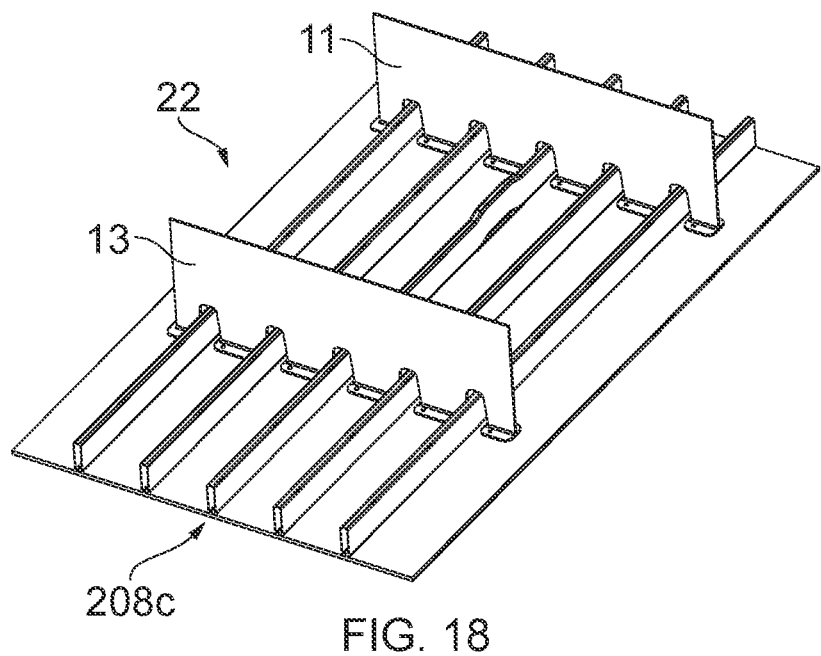
FIG. 18 is an isometric view of part of the lower cover and a pair of ribs, according to a third embodiment of the invention.
Figure 19:
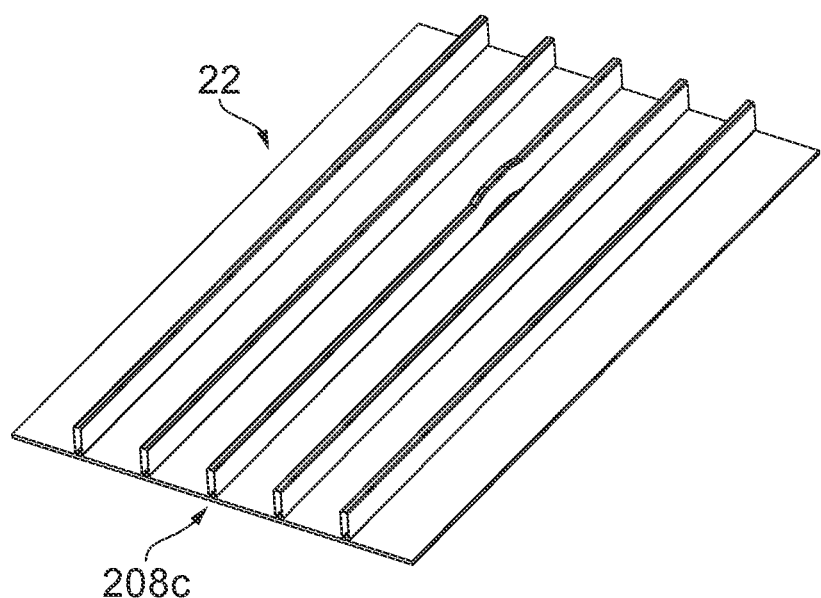
FIG. 19 shows the lower cover of FIG. 18 without the ribs.

The core 30 may be formed from a single piece as shown in FIGS. 14-16, or from multiple battens of fibre-reinforced composite material. Foam fillers, caps, or other elements may also form part of the core 30.

In this embodiment the core 30 has a rectangular cross-section, but this is not essential and other cross-sectional shapes are possible.

The shell 31 has a depth (labelled D1 in FIG. 16) and a width transverse to the length of the stringer (labelled W in FIG. 15). The depth (D1) of the shell is greater than the width (W) of the shell. In this example the aspect ratio (depth/width) is about four, although it may vary.

The relatively high aspect ratio (depth/width), compared with the T-section stringer 8c of FIGS. 4-10 makes the stringer 108c lighter and easier to arrange on the panel 22a with a small pitch between adjacent stringers, less prone to buckling, and less prone to damage at its free edge.

The stringer 108c is manufactured by surrounding the core 30 with the shell 31, for instance by wrapping or braiding the shell 31 around the core 30.

The stringer 108c may be assembled as a dry-fibre preform, i.e. with the shell 31 and the core 30 formed from porous dry-fibre material. Alternatively, the stringer 108c may be assembled as a prepreg, i.e. with the shell 31 and the core 30 assembled from "prepreg" fibre-reinforced composite material.

The panel 22a may be laid up on a mold tool as a dry-fibre preform, and the stringers 108a-d may be placed on the panel on the mold tool. Each stringer 108a-d may be assembled in prepreg and pre-cured before it is placed on the panel 22a, or it may be placed on the panel 22a as a dry-fibre preform.

The cover preform on the mold tool is then infused with a matrix material, which is then cured. The curing of the matrix material adheres the stringers 108a-d to the panel 22a. If each stringer 108a-d is pre-cured before it is laid onto the panel 22a, then the stringer is adhered to the panel 22a by a co-bonded joint. If each stringer is placed on the panel 22a as a dry-fibre preform, then the stringer and panel 22a preforms are co-infused by the matrix material, so that each stringer 108a-d becomes adhered to the panel 22a by a co-cured joint.

The use of a shell 31 with a closed cross-section which fully surrounds the core 30 is advantageous because it enables the stringer 108a-d to be easily assembled and handled "off-line" in an automated process, rather than being laid up "on-line" on a mold tool.

As shown in FIG. 14, the core 30 comprises inboard and outboard portions 30a, 30b and a bridge 30c. The portions 30a, 30b of the core are spaced apart in the lengthwise direction of the stringer 108c and connected to each other by the bridge 30c. Each portion 30a, 30b of the core is connected to a respective end of the bridge 30c. Each end of the bridge 30c deviates away from the panel 22a to form a hump with a concave stringer recess 155 under the bridge. As in the previous embodiment of FIGS. 4-10, this stringer recess 155 is positioned between the bridge 30c and the panel 22a. Unlike the previous embodiment, the shell foot 32 is positioned between the stringer recess 155 and the panel 22a.

The bridge 30c follows a curved path as it deviates away from the panel 22a, then it follows a planar ramp up to a flat apex. Other humped shapes are possible: for instance the apex and/or the ramps may be continuously rounded.

The bridge 30c has an inner (lower) surface which deviates away from the panel at each end of the bridge 30c to form the stringer recess 155. The bridge 30c also has an outer (upper) surface which deviates away from the panel 22a at each end of the bridge to form a convex protrusion.

As shown in FIG. 14, the inboard portion 30a of the core has a depth D1 between its inner and outer surfaces; the outboard portion 30b of the core has a depth D2 between its inner and outer surfaces, and the bridge 30c has a bridge depth D3 between its inner and outer surfaces at the apex of the protrusion. The bridge depth D3 at the apex of the protrusion is substantially the same as the depths D1, D2 of the inboard and outboard portions. In other words, the depth of the bridge 30c does not vary along the length of the bridge 30c.

The core 30 may be formed by tape laying, or any other suitable manufacturing technique. During this process, carbon reinforcement fibres are laid up which extend in the lengthwise direction of the stringer, which is aligned with the spanwise direction 42 of the wing. These reinforcement fibres are known as 0 degree fibres, and preferably they run continuously along the full length of the stringer or at least a majority of its length. The continuity of these 0 degree fibres is maintained by the undulating shape of the bridge 30c, which ensures that such 0 degree fibres do not need to be cut or otherwise terminated at the stringer recess. Thus the 0 degree fibres extend continuously between the inboard and outboard portions 30a, 30b of the core via the bridge 30c.

In order to maintain continuity of the 0 degree fibres through the full thickness of the core 30, each 0 degree fibre deviates away from the panel at each end of the bridge to form a hump following the same undulating contour as the inner and outer surfaces of the bridge. An exemplary pair of 0 degree fibres 158, 159 is indicated in FIGS. 15 and 16. The bridge 30c comprises a large number of such undulating 0 degree fibres.

The 0 degree fibres follow the undulating shape of the bridge. Thus the 0 degree fibres follow curved paths as they deviate away from the panel at each end of the bridge, then they follow ramps up to a flat apex between the ramps. Each ramp is rounded where it meets the apex. Other humped shapes are possible: for instance the apex and/or the ramps may be continuously rounded.

The fibres may be laid up as tape layers, and optionally the 0 degree fibres 158, 159 may be in the same vertically oriented tape layer. In this case the 0 degree fibres 158, 159 deviate in the vertical plane of the tape layer, rather than deviating out of the plane of the tape layer.

Optionally a continuous tow shearing technique may be used to lay up the undulating tape layers of the bridge 30c, for example as described in: Byung Chul Kim, Kevin Potter, Paul M.

Weaver, Continuous tow shearing for manufacturing variable angle tow composites, Composites Part A: Applied Science and Manufacturing, Volume 43, Issue 8, 2012, Pages 1347-1356, ISSN 1359-835X, https://doi.org/10.1016/j.compositesa.2012.02.024.

The core 30 may also comprise fibres running at different angles, for instance they may be 45 degree fibres running at +/−45 degrees to the length of the stringer.

The side walls 34, 35 of the shell and the shell crown 33 may also have 0 degree carbon reinforcement fibres which follow an undulating path like the 0 degree fibres in the bridge 30c, ensuring fibre continuity in the shell 31 as well as the core 30. Alternatively, the shell 31 may have no 0 degree carbon fibres. For instance the shell 31 may consist of braided fibres running at +/−45 degrees to the length of the stringer, which follow spiral paths along the length of the stringer. In this case, the central axis of each spiral path will follow an undulating path like the 0 degree fibres in the bridge 30c, so the central axis of the spiral path deviates away from the panel at each end of the bridge.

A fitting 156 in the stringer recess 155 has a through-hole which receives a tube 70. The tube 70 provides a flow passage 157 in the stringer recess 155 through which liquid fuel can flow across the stringer 108c. The fitting 156 may be formed from a foam material, a fibre-reinforced epoxy resin composite material made from recycled short carbon-fibres, or any other suitable lightweight material. The inner (lower) surface of the bridge 30c and the outer (upper) surface of the shell foot 32 are adhered to the fitting 156.

The tube 70 is formed from a non-porous and gas-tight material, such as a polymer, which does not fill up with resin during the resin infusion process. The tube 70 helps the fitting 156 keep its shape during the resin infusion process and prevents the flow passage 157 from filling with resin. Optionally, the tube 70 may be replaced by a solid Polytetrafluoroethylene (PTFE) plug, which prevents the through-hole in the fitting 156 from filling with resin and is then removed after cure.

An advantage of the stringer 108c is that it can be manufactured "off-line" as a single part, with the shell 31 enclosing not only the core 30 but also the fitting 156 and the tube/plug 70. The single part can then be laid onto the panel 22a and adhered to the panel 22a.

FIGS. 18-24 show an alternative embodiment. The ribs 11, 13 and cover panel 22a are given the same reference number and will not be described again. The stringers 8a-d, 108a-d are replaced by stringers 208c etc., one of which (stringer 208c) is formed with a stringer recess.

Figure 22:
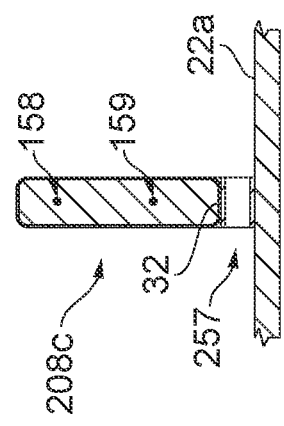
FIG. 22 is a transverse sectional view across the bridge, taken along a line H-H in FIG. 20.
Figure 23:
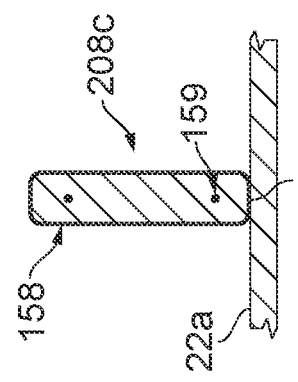
FIG. 23 is a transverse sectional view across the stringer, taken along a line I-I in FIG. 20.
Figure 21:
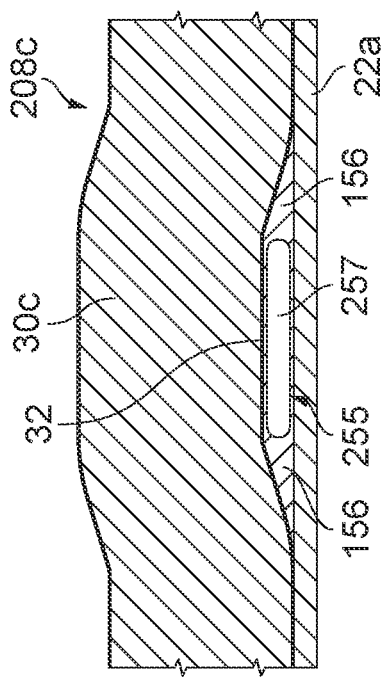
FIG. 21 is a longitudinal sectional view along the bridge, taken along a line G-G in FIG. 20.
Figure 20:
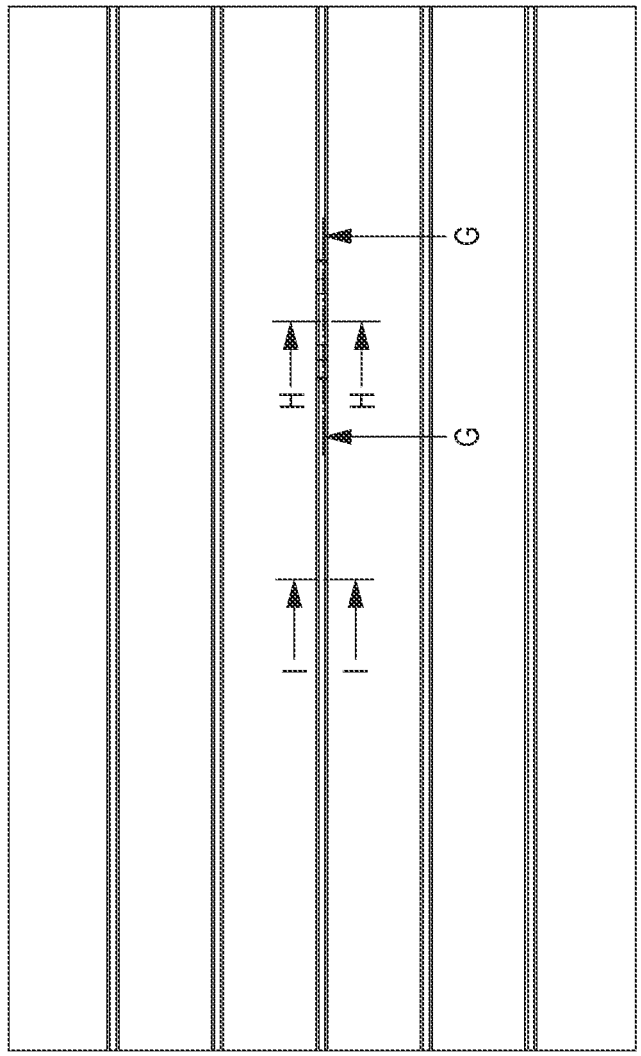
FIG. 20 is a plan view of the panel assembly of FIG. 19.
Figure 24:
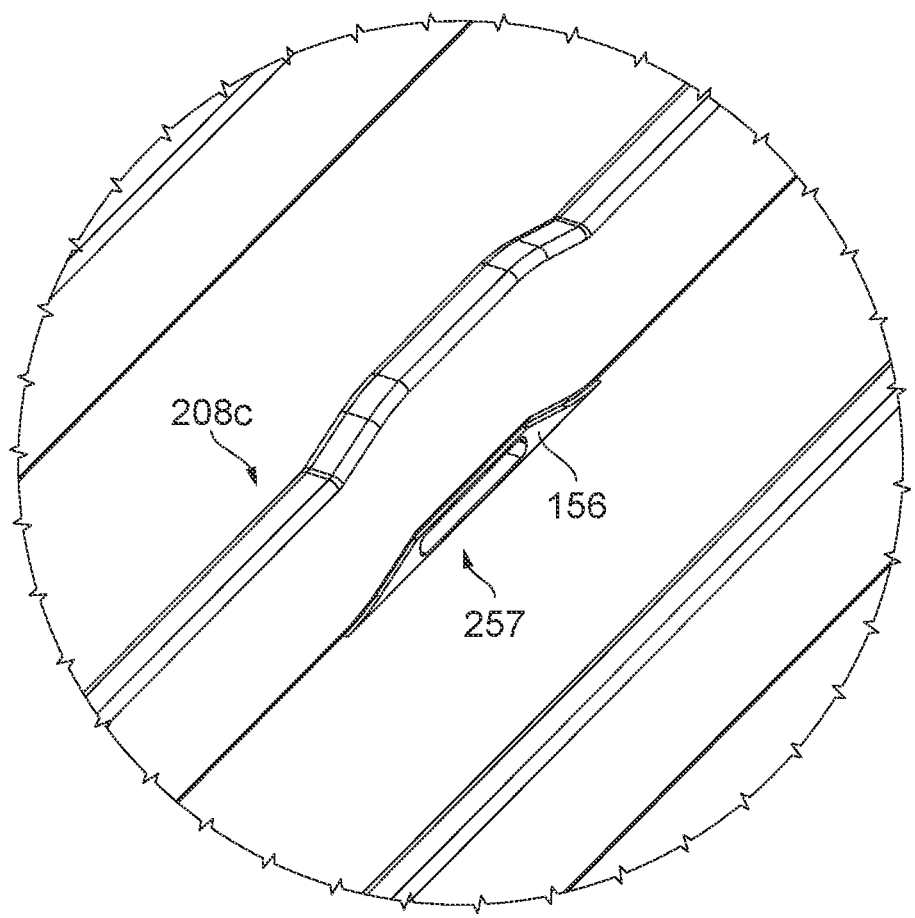
FIG. 24 is an isometric view showing the bridge and flow passage.

FIGS. 22 and 23 show the stringer 208c in cross-section transverse to its length. The other stringers in FIG. 18 have the same cross-section.

The stringer 208c has a similar construction to the stringer 108c, with a core 30 and a shell 31. The same reference numbers are given for the various elements of the core and shell, and these elements will not be described again.

The stringer 208c has a stringer recess 255 which receives the fitting 156. In this case no tube 70 is provided, so a through-hole 257 of the fitting 156 provides the flow passage in the stringer recess 255 through which liquid fuel can flow across the stringer 208c.

In the stringer 108c of FIGS. 11-17, the shell foot 32 is adhered to the panel 22a along its full length, so that the shell foot 32 is positioned between the stringer recess 155 and the panel 22a. In the stringer 208c of FIG. 18-24, the shell foot 32 deviates away from the panel at the stringer recess 255 as shown most clearly in FIG. 21. Thus in the embodiment of FIG. 18-24, the shell foot 32 is not positioned between the stringer recess 255 and the panel 22a. An advantage of this embodiment is that the flow passage 257 of the stringer 208c is slightly closer to the panel 22a than the flow passage 157 of the stringer 108c.

The shell foot 32, the side walls 34, 35 of the shell and the shell crown 33 may have 0 degree carbon reinforcement fibres which follow an undulating path like the 0 degree fibres in the bridge 30c, ensuring fibre continuity in the shell 31 as well as the core 30. Alternatively, the shell 31 may have no 0 degree carbon fibres. For instance the shell 31 may consist of braided fibres running at +/−45 degrees to the length of the stringer, which follow spiral paths along the length of the stringer. In this case, the axis of each spiral path (i.e. its geometric centre) will follow an undulating path like the 0 degree fibres in the bridge 30c, so the axis of the spiral path deviates away from the panel at each end of the bridge.

Figure 25:
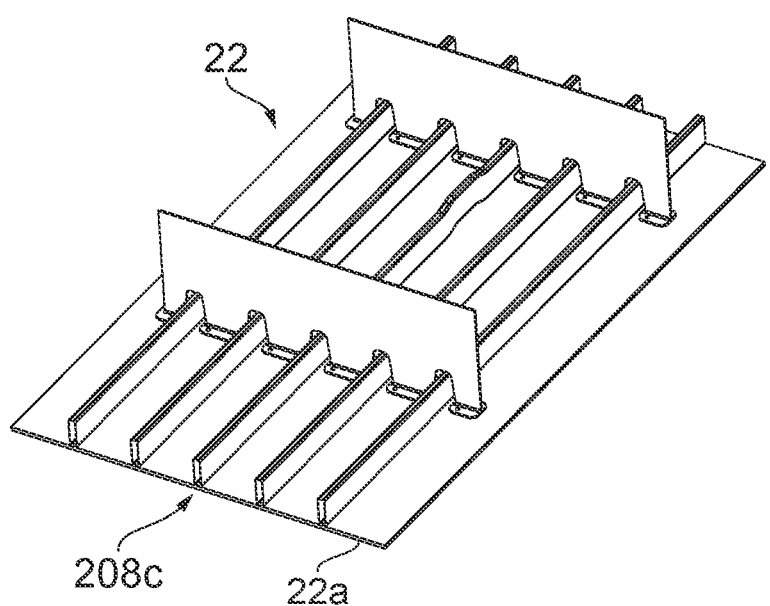
FIG. 25 is an isometric view of part of the lower cover and a pair of ribs, according to a first embodiment of the invention.
Figure 26:
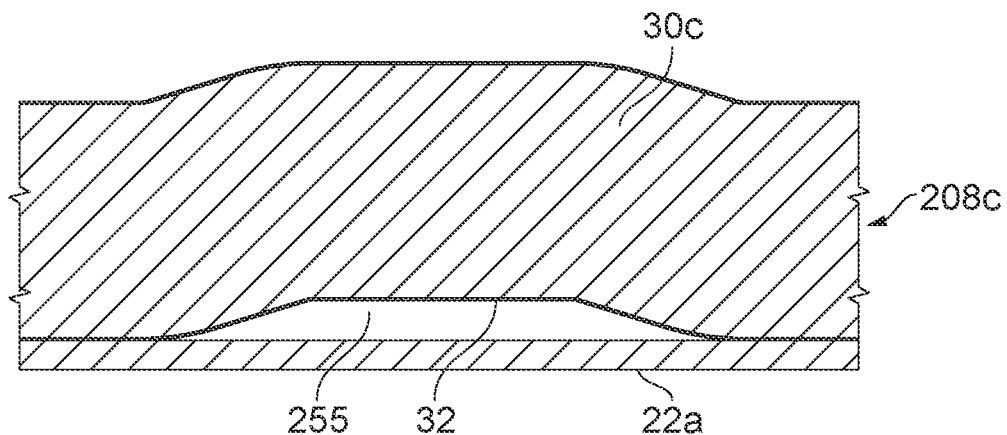
FIG. 26 is a longitudinal sectional view along the bridge.
Figure 27:
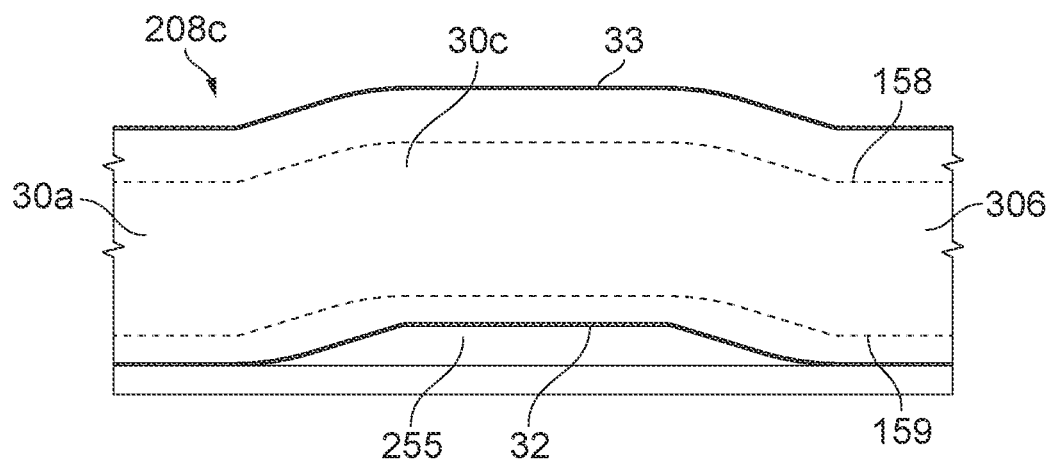
FIG. 27 is a longitudinal sectional view along the bridge showing the undulating paths of a pair reinforcement fibres.

FIGS. 25-27 show an alternative embodiment which is identical to the embodiment of FIGS. 18-24, except the fitting 156 is omitted. The same reference numbers are used for identical components, which will not be described again.

Since no fitting 156 or tube 70 is provided, the full area of the stringer recess 255 provides the flow passage through which liquid fuel can flow across the stringer 208c.

FIG. 27 schematically illustrates the undulating paths of the 0 degree fibres 158, 159 as they deviate away from the panel at each end of the bridge 30c. The reinforcement fibres of the shell foot 32, the shell side walls 34, 35 and the shell crown 33 may follow similar undulating paths. The 0 degree fibres 58, 59 in the stringer 8c may follow undulating paths with a similar profile, in line with the upper and lower surfaces of the bridge 52c.

In this example, all of the 0 degree fibres in the bridge 30c deviate away from the panel at each end of the bridge 30c to form a humped or undulating shape. However this is not essential and optionally further reinforcement fibres may be provided in the bridge 30c which either do not deviate away from the panel 22a or do not extend along the full length of the bridge 30c.

The stiffened panel assemblies described above are covers for an aircraft wing, but the invention may be applied to other types of stiffened panel assembly for an aircraft fuel tank which may be located in some other part of the aircraft, such as the fuselage.

The invention may also be applied to fuel tanks other than aircraft fuel tanks—for example fuel tanks for other vehicles, or static fuel tanks.

An alternative method of providing a drain hole in a stringer, not part of the present invention, would be to provide a conventional "T-section" stringer and drill a hole in the stringer blade. This would create fibre discontinuities and resulting stress concentrations which affect the static strength of the stringer. The present invention provides reinforcement fibres which deviate away from the panel at each end of the bridge, resulting in a more continuous fibre arrangement.

In the embodiments described above, flow passages are provided in stringers of the lower cover 22 to enable liquid fuel to migrate between stringer bays. In an alternative embodiment, similar flow passages may be provided in one or more stringers of the upper cover 21, to enable air to migrate between stringer bays.

As the fuel tank is filled with liquid fuel, air can become trapped between stringer blades and the outboard boundary of the fuel tank. Flow passages in the stringers allow the air to migrate between stringer bays to the top of the tank where a vent system is provided. The reverse applies when the tank is emptied. Thus flow passages in the stringers of the upper cover 21 enable the fuel tank to be filled to almost maximum capacity.

In summary, the embodiments of the invention described above provide a panel assembly comprises a panel 22a and stringers attached to the panel. At least one of the stringers 8c, 108c, 208c has a flow passage through which fluid (liquid or gas) can flow across the stringer. The stringer comprises a pair of portions 52a/52b, 30a/30b which are spaced apart in a lengthwise direction of the stringer and connected to each other by a bridge 52c, 30c. Each portion is connected to a respective end of the bridge and each end of the bridge deviates away from the panel. The stringer comprises reinforcement fibres which extend between the portions via the bridge and deviate away from the panel at each end of the bridge. These reinforcement fibres may be 0 degree fibres extending parallel to the lengthwise direction of the stringer, or they may follow spiral paths as they run along the length of the stringer. The stringer comprises a stringer recess between the bridge and the panel, and the flow passage is located in the stringer recess.

Optionally not all of the reinforcement fibres of the stringer extend between the portions via the bridge and deviate away from the panel at each end of the bridge. For example, further reinforcement fibres may be provided in the stringer which do not extend between the portions via the bridge, such as 90 degree fibres extending transverse to the lengthwise direction of the stringer or 45 degree fibres extending at 45 degrees to the lengthwise direction of the stringer. Alternatively, further 0 degree reinforcement fibres may be provided which extend between the portions via the bridge but do not deviate away from the panel as they do so.

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. A fuel tank, comprising:
a lower cover and an upper cover;
wherein the lower cover or the upper cover comprises a panel assembly;
wherein the panel assembly comprises a panel and a stringer attached to the panel;
wherein the stringer comprises a pair of portions which are spaced apart in a lengthwise direction of the stringer and connected to each other by a bridge;
wherein each portion is connected to a respective end of the bridge;
wherein each end of the bridge deviates away from the panel;
wherein the bridge comprises an outer surface which deviates away from the panel at each end of the bridge to form a protrusion;
wherein the bridge has a depth at an apex of the protrusion, and each portion has a depth which is substantially the same as the depth of the bridge at the apex of the protrusion;
the stringer comprises reinforcement fibres which extend between the portions via the bridge;
wherein each reinforcement fibre deviates away from the panel at each end of the bridge; and
wherein the stringer comprises a stringer recess between the bridge and the panel, and a flow passage in the stringer recess through which fluid can flow across the stringer.

2. The fuel tank according to claim 1, wherein the stringer comprises a foot and a stiffening part; and the foot is attached to the panel.

3. The fuel tank according to claim 2, wherein the portions comprise attachment portions of the foot; and the attachment portions of the foot are attached to the panel.

4. The fuel tank according to claim 2, wherein the portions comprise stiffening portions of the stiffening part.

5. The fuel tank according to claim 1, wherein the bridge comprises a core, and a shell surrounding the core.

6. The fuel tank according to claim 1, wherein the bridge comprises a core and a shell surrounding the core; the shell comprises a shell foot which is attached to the panel; the portions comprise portions of the core; and the shell foot is between the bridge and the panel.

7. The fuel tank according to claim 1, wherein the stringer comprises a core and a shell surrounding the core; the shell comprises a shell foot; and the portions comprise attachment portions of the shell foot which are attached to the panel.

8. The fuel tank according to claim 1, wherein the bridge comprises a fibre-reinforced composite material, and the reinforcement fibres are fibres of the fibre-reinforced composite material.

9. The fuel tank according to claim 1, wherein the reinforcement fibres follow curved paths as they deviate away from the panel at each end of the bridge.

10. The fuel tank according to claim 1, further comprising a pair of further stringers attached to the panel on opposites sides of the stringer; a first stringer bay; and a second stringer bay, wherein each stringer bay is between the stringer and a respective one of the further stringers, and the flow passage enables fluid to flow from the first stringer bay to the second stringer bay.

11. The fuel tank according to claim 1, wherein the lower cover comprises the panel assembly; and the flow passage enables liquid fuel to flow across the stringer.

12. The fuel tank according to claim 1, further comprising a rib attached to the panel; wherein the rib comprising a rib recess, the stringer passes through the rib recess between the rib and the panel, and the rib recess is configured to provide a flow passage through which fluid can flow across the rib.

13. The fuel tank according to claim 1, further comprising a fitting in the stringer recess, wherein the flow passage is in the fitting.

14. The fuel tank according to claim 1, wherein the protrusion comprises a pair of ramps, and an apex between the ramps.

15. The fuel tank according to claim 1, wherein the bridge and/or each reinforcement fibre deviates away from the panel to form a hump.

16. The fuel tank according to claim 1, wherein the fuel tank is an aircraft fuel tank.

17. An aircraft wing comprising an aircraft fuel tank according to claim 16, wherein the aircraft wing extends in a spanwise direction from a wing root to a wing tip; and the lengthwise direction of the stringer extends in the spanwise direction.

18. A fuel tank comprising a lower cover and an upper cover;
- wherein the lower cover or the upper cover comprises a panel assembly;
- the panel assembly comprises a panel and a stringer attached to the panel; the stringer comprises first and second portions which are spaced apart in a lengthwise direction of the stringer and connected to each other by a bridge;
- the first and the second portions are connected to a respective end of the bridge; each end of the bridge deviates away from the panel;
- the bridge comprises an outer surface which deviates away from the panel at each end of the bridge to form a protrusion, wherein the depth of the bridge at an apex of the protrusion is substantially the same as the depths of the first and the second portions;
- the stringer comprises reinforcement fibres which extend between the portions via the bridge; and
- the stringer comprises a stringer recess between the bridge and the panel, and a flow passage in the stringer recess through which fluid can flow across the stringer.

\* \* \* \* \*